US009272377B2

(12) United States Patent
Miyoshi

(10) Patent No.: US 9,272,377 B2
(45) Date of Patent: Mar. 1, 2016

(54) PRODUCTION SYSTEM AND ARTICLE PRODUCING METHOD

(71) Applicant: KABUSHIKI KAISHA YASKAWA DENKI, Kitakyushu-shi (JP)

(72) Inventor: Tetsuya Miyoshi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 336 days.

(21) Appl. No.: 13/719,230

(22) Filed: Dec. 19, 2012

(65) Prior Publication Data

US 2013/0185913 A1 Jul. 25, 2013

(30) Foreign Application Priority Data

Jan. 24, 2012 (JP) ................. 2012-011686

(51) Int. Cl.
*B23P 21/00* (2006.01)
*B23Q 17/00* (2006.01)
(Continued)

(52) U.S. Cl.
CPC ............. *B23P 23/00* (2013.01); *B23P 21/00* (2013.01); *G05B 19/41865* (2013.01); *G05B 19/4183* (2013.01); *Y02P 90/04* (2015.11); *Y02P 90/20* (2015.11); *Y10T 29/49764* (2015.01); *Y10T 29/49769* (2015.01); *Y10T 29/49826* (2015.01); *Y10T 29/53039* (2015.01); *Y10T 29/53061* (2015.01); *Y10T 29/53087* (2015.01); *Y10T 29/53539* (2015.01)

(58) Field of Classification Search
CPC ............ G05B 19/41865; G05B 19/41815; G05B 19/4183; B23P 21/00; Y10T 29/53539; Y10T 29/49764; Y10T 29/49769; Y10T 29/53039; Y10T 29/53043; Y10T 29/53061; Y10T 29/53087; Y10T 29/5303; Y10T 29/53026; Y10T 29/53009; Y10T 29/53013; Y10T 29/53017
USPC ......... 29/407.01, 407.04, 709, 710, 714, 720, 29/707, 706, 702, 703, 704
See application file for complete search history.

(56) References Cited

U.S. PATENT DOCUMENTS 3,162,767 A * 12/1964 Di Curcio et al. ............. 850/16
4,727,471 A * 2/1988 Driels ................... B25J 9/1692
348/94
(Continued)

FOREIGN PATENT DOCUMENTS

CN 102164474 8/2011
JP 06252594 A * 9/1994 ............. H05K 13/04
(Continued)

OTHER PUBLICATIONS

Japanese Office Action for corresponding JP Application No. 2012-011686, Nov. 19, 2013.
(Continued)

*Primary Examiner* — Essama Omgba
(74) *Attorney, Agent, or Firm* — Mori & Ward, LLP

(57) ABSTRACT

An assembling device (a production system) includes robots that produce a piping component from a plurality of types of parts, and a display that accepts an input of lot information of at least one of the plurality of parts used in producing operations by the first to third robots and that outputs unsuitable condition information when an unsuitable condition in any of the parts is detected, the unsuitable condition information identifying a lot of the any of the parts in which the unsuitable condition is detected.

12 Claims, 11 Drawing Sheets

(51) Int. Cl.
*B23P 23/00* (2006.01)
*G05B 19/418* (2006.01)

(56) References Cited

U.S. PATENT DOCUMENTS

| | | | | |
|---|---|---|---|---|
| 4,819,783 | A * | 4/1989 | Pinyan et al. | 198/395 |
| 4,985,846 | A * | 1/1991 | Fallon | 382/153 |
| 5,237,468 | A * | 8/1993 | Ellis | B25J 5/02 |
| | | | | 360/92.1 |
| 5,737,827 | A * | 4/1998 | Kuse et al. | 29/701 |
| 6,056,108 | A | 5/2000 | Buchi et al. | |
| 6,236,901 | B1 * | 5/2001 | Goss | 700/95 |
| 6,627,016 | B2 * | 9/2003 | Abare et al. | 156/64 |
| 7,937,176 | B2 * | 5/2011 | Knipfer et al. | 700/99 |
| 8,145,336 | B2 * | 3/2012 | Knipfer et al. | 700/105 |
| 8,229,586 | B2 * | 7/2012 | Wallace et al. | 700/112 |
| 8,559,699 | B2 * | 10/2013 | Boca | 382/153 |
| 2002/0100159 | A1 * | 8/2002 | Swartz et al. | 29/430 |
| 2006/0043174 | A1 * | 3/2006 | Banavar et al. | 235/383 |
| 2007/0061186 | A1 * | 3/2007 | Boraas et al. | 705/10 |
| 2008/0103622 | A1 * | 5/2008 | Hanses et al. | 700/116 |
| 2009/0118858 | A1 * | 5/2009 | Wallace et al. | 700/110 |
| 2009/0177560 | A1 * | 7/2009 | Ishizuka | 705/29 |
| 2010/0017033 | A1 * | 1/2010 | Boca | 700/258 |
| 2010/0036515 | A1 * | 2/2010 | Knipfer et al. | 700/105 |
| 2011/0301758 | A1 * | 12/2011 | Nakajima | B25J 9/1641 |
| | | | | 700/259 |

FOREIGN PATENT DOCUMENTS

| | | | | |
|---|---|---|---|---|
| JP | 11-180538 | | 7/1999 | |
| JP | 2001-056706 | | 2/2001 | |
| JP | 2003211382 | A * | 7/2003 | |
| JP | 2003331550 | A * | 11/2003 | B23P 19/00 |
| JP | 2006-035346 | | 2/2006 | |
| JP | 2008242756 | A * | 10/2008 | G06Q 50/00 |
| JP | 2009032226 | A * | 2/2009 | G05B 19/418 |
| JP | 2011-110628 | | 6/2011 | |
| JP | 2013152504 | A * | 8/2013 | G05B 19/418 |
| WO | 2008/087702 | | 7/2008 | |

OTHER PUBLICATIONS

Chinese Office Action for corresponding CN Application No. 201310023606.2, Dec. 3, 2014.

* cited by examiner

US 9,272,377 B2

PRODUCTION SYSTEM AND ARTICLE PRODUCING METHOD

CROSS-REFERENCE TO RELATED APPLICATIONS

The present disclosure contains subject matter related to that disclosed in Japanese Priority Patent Application JP 2012-011686 filed in the Japan Patent Office on Jan. 24, 2012, the entire contents of which are hereby incorporated by reference.

BACKGROUND OF THE PRESENT INVENTION

1. Field of the Present Invention

The embodiments disclosed herein relates to a production system and an article producing method.

2. Description of the Related Art

Hitherto, a production system (parts assembling method) including a double arm robot (producing device) that produces a predetermined finished product from a plurality of parts has been available (refer to, for example, Japanese Unexamined Patent Application Publication No. 2006-35346 (Patent Document 1)).

Patent Document 1 discloses a parts assembling method (production system) including a double arm robot that holds and assembles parts. In the parts assembling method, the parts that are supplied by a part supplying device are taken out by the double arm robot, and the taken out parts (such as a valve) are inserted into a valve body having a valve hole.

However, in the parts assembling method (production system) in the aforementioned Patent Document 1, even if an unsuitable condition (such as a scratch) exists in a part that is supplied by the part supplying device, the unsuitable part may be assembled by the double arm robot. In general, it is desirable that parts included in a lot that is the same as that of the unsuitable part not be used in the assembly operation. However, in the parts assembling method in the aforementioned Patent Document 1, even parts included in a lot that is the same as that of the unsuitable part are assembled by the double arm robot. In particular, in fields in which, for example, medical parts, chemical parts, or electronic parts are to be precisely supplied, control is strictly performed so that such a problem does not occur.

SUMMARY OF THE PRESENT INVENTION

To this end, according to an aspect of the disclosure, there is provided a production system including a producing device that produces a predetermined finished product from the same type or a plurality of types of parts; a lot information input accepting section that accepts an input of lot information of at least one part of the same type or the plurality of types of parts used in producing the finished product by the producing device; and an outputting section that outputs unsuitable condition information when an unsuitable condition in any of the parts is detected, the unsuitable condition information identifying a lot of the any of the parts in which the unsuitable condition is detected.

According to another aspect of the disclosure, there is provided an article producing method including accepting at a lot information input accepting section lot information of at least one part of the same type or a plurality of types of parts used in a producing operation by a producing device that produces a predetermined finished product from the same type or the plurality of types of parts; and outputting unsuitable condition information at an outputting section when an unsuitable condition in any of the parts is detected, the unsuitable condition information identifying a lot of the any of the parts in which the unsuitable condition is detected.

DESCRIPTION OF THE EMBODIMENTS

An embodiment according to the present disclosure will hereunder be described with reference to the drawings.

The structure of an assembling device 100 according to an embodiment will be described with reference to FIGS. 1 to 13. The assembling device 100 according to the embodiment is used for assembling a piping component 200 (see FIG. 12). The assembling device 100 is an exemplary production system according to the present disclosure. The application of the piping component according to the embodiment is not limited to devices in the medical field. The piping component may also be applied to, for example, devices in the chemical field or the electrical field.

Figure 1:
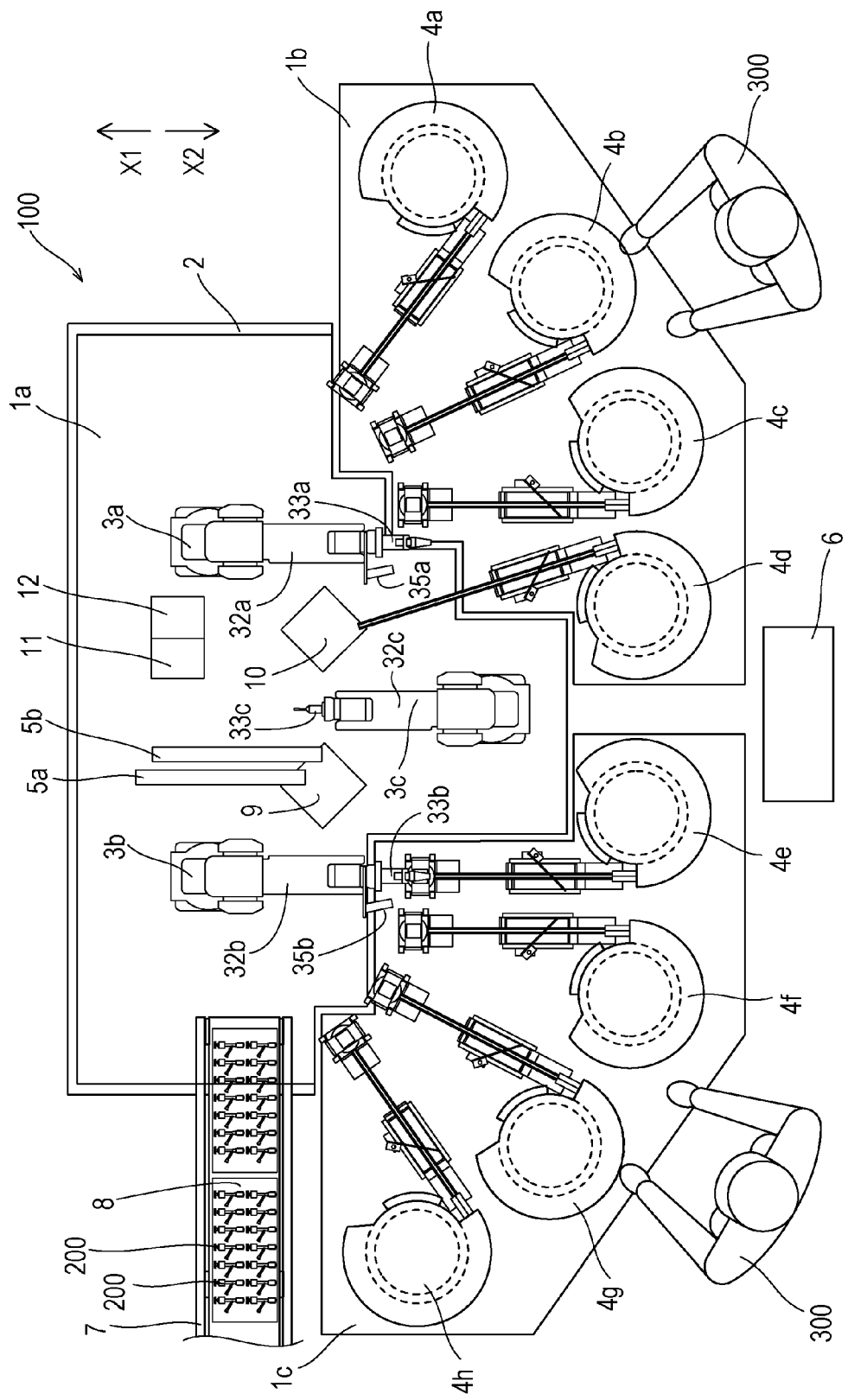
FIG. 1 is a top view of an assembling device according to an embodiment of the present disclosure.

As shown in FIG. 1, the assembling device 100 includes bases 1a, 1b, and 1c, a working area partition wall 2, three robots 3a, 3b, and 3c, eight parts feeders 4a, 4b, 4c, 4d, 4e, 4f, 4g, and 4h, two linearly moving feeders 5a and 5b, and an operating panel 6. A conveyor 7 is disposed adjacent to the assembling device 100. A box 8 is placed on the conveyor 7. The robots 3a, 3b, and 3c are exemplary producing devices according to the present disclosure, for which, for example, dedicated devices that specially perform assembly steps may be used. The parts feeders 4a to 4h are exemplary parts suppliers according to the present disclosure, for which, for example, boxes that accommodate parts may be used. The linearly moving feeders 5a and 5b are exemplary parts suppliers, for which, for example, boxes that accommodate parts may be used.

A parts assembly jig 9 for securing a part 217 (described later) and a part assembly jig 10 for assembling a part 221 are disposed on the top surface of the base 1a. A spindle motor 11 and a press-fitting device 12 are also disposed on the top surface of the base 1a. These are exemplary devices which constitute the assembling device 100. Various other devices may also be disposed, as appropriate.

Figure 2:
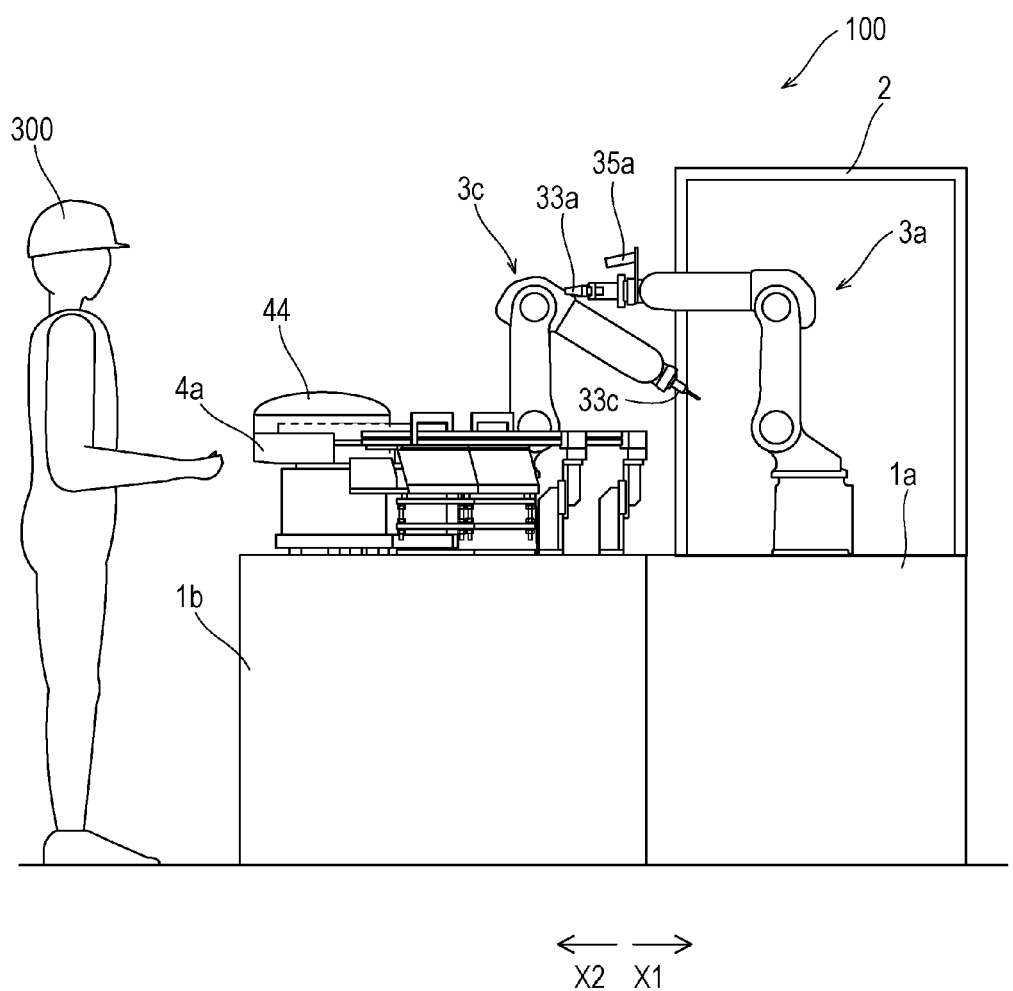
FIG. 2 is a side view of the assembling device according to the embodiment of the present disclosure.

As shown in FIGS. 1 and 2, the three robots 3a, 3b, and 3c are placed on the top surface of the base 1a. An end (chuck 33a) of a robot arm 32a of the robot 3a is disposed so as to face a side in the direction of arrow X2. An end (chuck 33b) of a robot arm 32b of the robot 3b is also disposed so as to face the side in the direction of arrow X2. Unlike the robots 3a and 3b, an end (dispenser 33c) of a robot arm 32c of the robot 3c is disposed so as to face a side in the direction of arrow X1.

Figure 3:
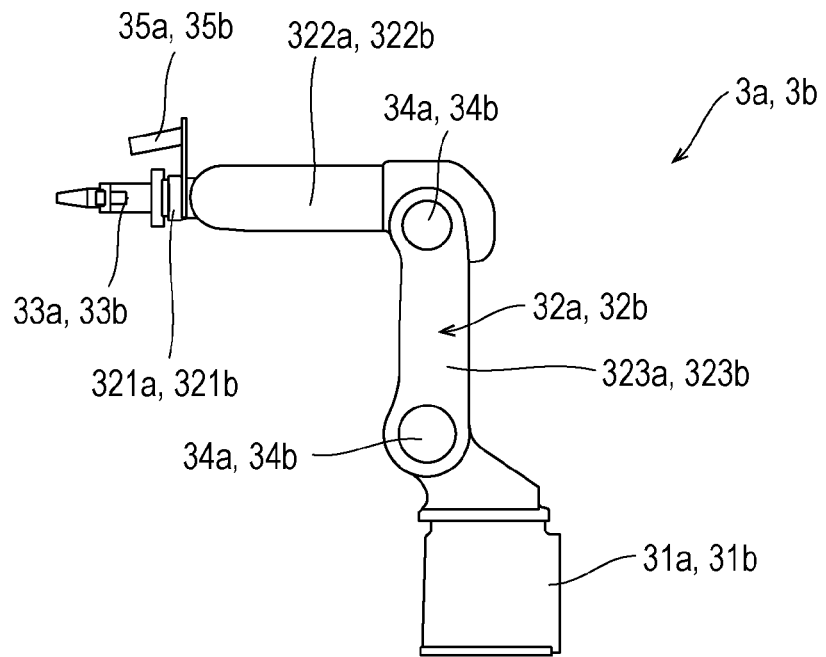
FIG. 3 is a side view of each robot that assembles parts of the assembling device according to the embodiment of the present disclosure.

As shown in FIG. 3, the robot 3a (3b) includes a base 31a (31b), the robot arm 32a (32b) that is mounted to the base 31a (31b), the chuck 33a (33b) that is mounted to an end of the robot arm 32a (32b), and a robot controller (not shown) that controls the overall operation of the robot 3a (3b). The robot 3a is a vertical articulated robot including the robot arm 32a having three arm portions 321a, 322a, and 323a. Servo motors (not shown) for driving the arm portions 321a, 322a, and 323a are built in the base 31a and joints 34a that connect the three arm portions 321a, 322a, and 323a. The arm portions 321a, 322a, and 323a are driven by controlling the drivings of these servo motors by the robot controller (not shown). Similarly, the robot 3b is also a vertical articulated robot including the robot arm 32b having three arm portions 321b, 322b, and 323b. The three arm portions 321b, 322b, and 323b are connected by joints 34b.

Here, in the embodiment, the robot 3a (3b) is formed so as to assemble a plurality of types of parts (a cover 211, a part 212, a packing 213, a part 214, a packing 216, a part 217, and a part 220 (see FIG. 13)) constituting the piping component 200 (described later). The robot 3a (3b) is formed to detect unsuitable conditions (such as scratches, air bubbles in parts) occurring in the plurality of types of parts constituting the piping component 200. More specifically, an image pickup camera 35a (35b) is provided on the arm portion 321a (321b) of the robot 3a (3b). Any unsuitable condition occurring in a part is detected by performing imaging on the part by the image pickup camera 35a (35b) of the robot 3a (3b) prior to assembling the plurality of types of parts by the robot 3a (3b). The image pickup cameras 35a and 35b are exemplary image pickup sections according to the present disclosure. The piping component 200 is an exemplary finished product and an exemplary medical component according to the present disclosure. The cover 211, the part 212, the packing 213, the part 214, the packing 216, the part 217, and the part 220 are exemplary parts according to the present disclosure.

In the embodiment, the robots 3a, 3b, and 3c are formed so as to be controlled so that, when an unsuitable condition is detected in a part, the assembly of the plurality of types of parts is stopped and assembly using a part characterized by lot information (lot number) that is the same as that of the detected unsuitable part is not performed. When an unsuitable condition in the part is detected, the operations of the parts feeders 4a to 4h, the linearly moving feeders 5a and 5b, and the conveyor 7 are also stopped.

Figure 4:
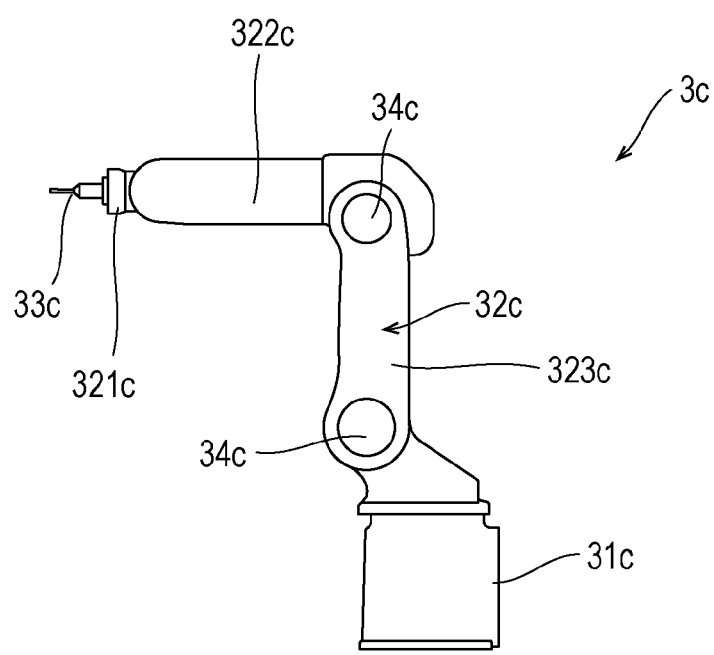
FIG. 4 is a side view of a robot that applies grease and an adhesive to the parts of the assembling device according to the embodiment of the present disclosure.

As shown in FIG. 4, the robot 3c includes a base 31c, the robot arm 32c that is mounted to the base 31c, the dispenser 33c that is provided at an end of the robot arm 32c and that applies, for example, grease, and a robot controller (not shown) that controls the overall operation of the robot 3c. The robot 3c is a vertical articulated robot including the robot arm 32a having three arm portions 321c, 322c, and 323c. The three arm portions 321c, 322c, and 323c are connected by joints 34c.

Figure 5:
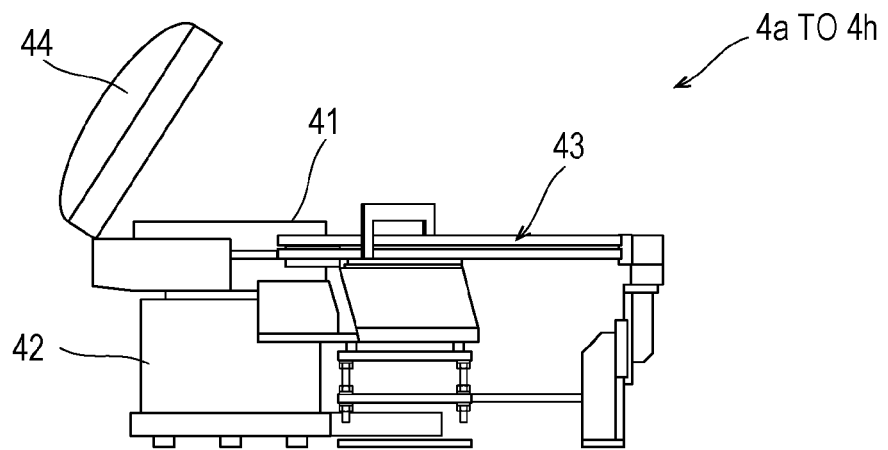
FIG. 5 is a side view of each parts feeder of the assembling device according to the embodiment of the present disclosure.

As shown in FIG. 1, the parts feeders 4a to 4d are disposed on the top surface of the base 1b, and the parts feeders 4e to 4h are disposed on the top surface of the base 1c. As shown in FIG. 5, the parts feeder 4a includes a bowl 41, an oscillating body 42, a linearly moving feeder 43, and a cover 44. The cover 44 is disposed on the bowl 41. The parts of the piping component 200 (the cover 211, the part 212, the packing 213, the part 214, the packing 216, the part 217, and the part 220 (see FIG. 13)) are accommodated in the bowl 41. The parts accommodated in the bowl 41 are sent to the linearly moving feeder 43 by oscillation of the oscillating body 42. The parts that are sent by the linearly moving feeder 43 are supplied to the vicinity of the robots 3a, 3b, and 3c. The parts feeders 4b to 4h have the same structure as the parts feeder 4a.

Figure 6:
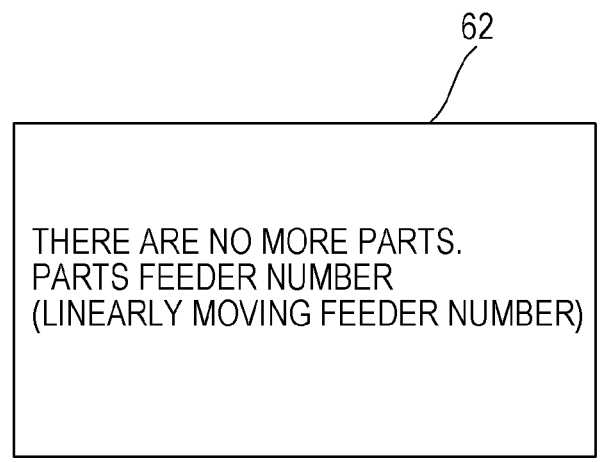
FIG. 6 shows a state in which a display of the assembling device according to the embodiment of the present disclosure displays that there are not more parts.

Here, in the embodiment, the parts feeders 4a to 4h are formed so that, when the number of parts supplied by any one of the parts feeders 4a to 4h has reached the number of parts accepted by a touch-panel display 62 of the operating panel 6 (described later), it is indicated that the number of supplied parts has reached the accepted number of parts. More specifically, as shown in FIG. 6, the display 62 displays that the number of parts supplied by the parts feeder among the parts feeders 4a to 4h has reached the number of parts accepted at the display 62 (that is, that there are no more parts in the parts feeder among the parts feeders 4a to 4h). Further, when the number of parts supplied by any of one the parts feeders 4a to 4h has reached the number of parts accepted at the display 62, the cover 44 of the parts feeder in which the accepted number of parts has been reached opens, so that parts of a next lot can be supplied. For example, when the number of parts 217 supplied from the parts feeder 4e (described later) has reached the number of parts (such as 500 parts) accepted at the display 62, the cover 44 of the parts feeder 4e opens so that parts 217 of a next lot can be supplied. The number of parts per lot depends upon the part type (such as 500 parts 217 per lot, 1000 parts 220 per lot), so that the timings in which the parts in the parts feeders are used up depend on the part type (parts feeder).

Figure 7:
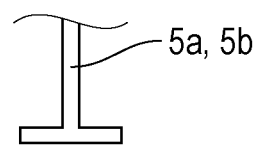
FIG. 7 shows each linearly moving feeder of the assembling device according to the embodiment of the present disclosure.

As shown in FIG. 1, the linearly moving feeders 5a and 5b are disposed on the top surface of the base 1a. As shown in FIG. 7, as seen from the front, the linearly moving feeder 5a (5b) has the shape of the letter T, and a part (not shown) is suspended therefrom. In the embodiment, as shown in FIG. 6, when the numbers of parts that have been supplied by the linearly moving feeders 5a and 5b have reached the numbers of parts accepted at the display 62, the display 62 displays (indicates) that the numbers of parts supplied by the linearly moving feeders 5a and 5b have reached the numbers of parts accepted at the display 62 (there are no more parts in the linearly moving feeders 5a and 5b).

Figure 8:
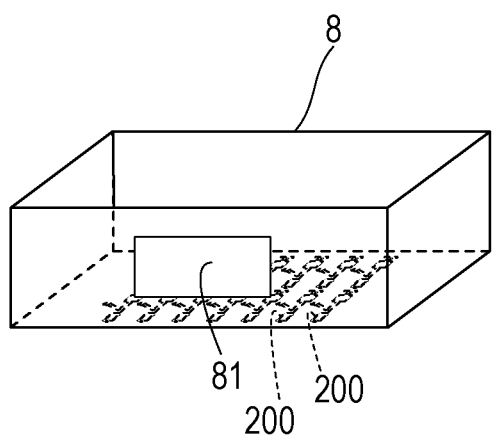
FIG. 8 is a perspective view of a box of the assembling device according to the embodiment of the present disclosure.

As shown in FIG. 8, in the embodiment, the piping component 200 after being assembled from a plurality of types of parts is accommodated in the box 8 where part lot information is identifiable. For example, a label 81 on which the part lot information (the lot number of each part) and information identifying the box 8 are indicated is affixed to a side surface of the box 8. Since the numbers of parts per lot are large numbers of parts (such as 500 parts, 1000 parts, 2000 parts), not all of the parts having the same lot number (piping components 200) can be accommodated in one box 8. Therefore, the parts (piping components 200) having the same lot number are accommodated so as to be divided in a plurality of boxes 8.

Figure 9:
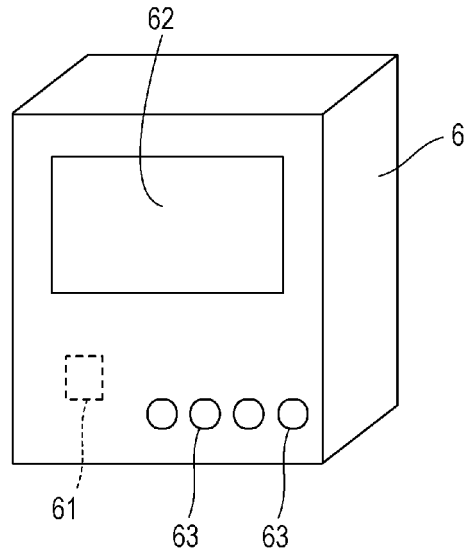
FIG. 9 is a perspective view of an operating panel of the assembling device according to the embodiment of the present disclosure.
Figure 10:
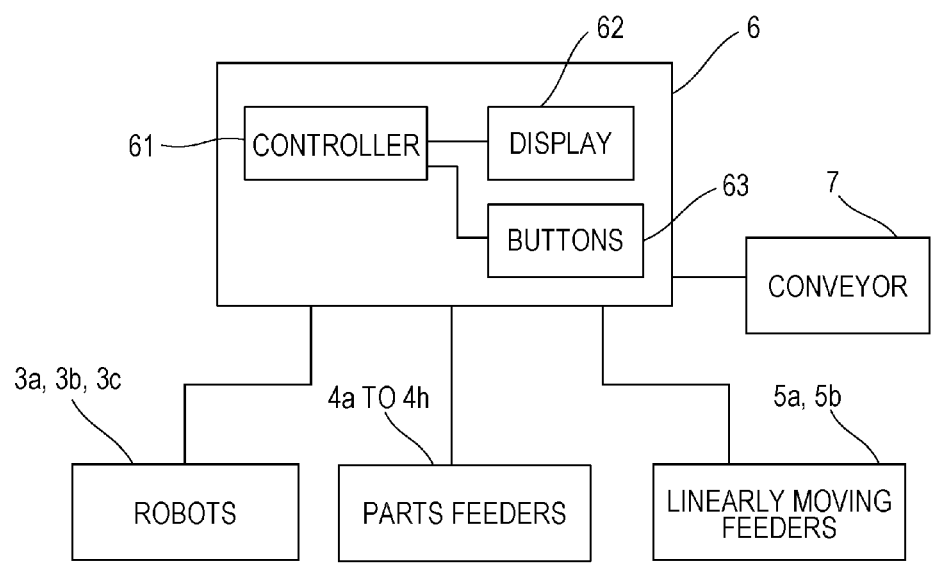
FIG. 10 is a block diagram of the assembling device according to the embodiment of the present disclosure.

As shown in FIGS. 9 and 10, the operating panel 6 includes a controller 61, the display 62 of, for example, a touch panel type, and a plurality of buttons 63 including, for example, an emergency stop button. Here, in the embodiment, the controller 61 is responsible for controlling the entire assembling device 100. More specifically, the controller 61 is formed so as to control display (output) of the display 62 and control acceptance of inputs to the display 62, and so as to send a signal for controlling the operations of the robots 3a to 3c to the robot controllers (not shown) of the robots 3a to 3c. The controller 61 is also formed so as to control the operations of the parts feeders 4a to 4h and the operations of the linearly moving feeders 5a and 5b. The display 62 is formed so as to be controlled by the controller 61 so that the display 62 accepts inputs of lot information (part name, lot number, number of parts) of each of the plurality of types of parts (the covers 211, the parts 212, the packings 213, the parts 214, the packings 216, the parts 217, and the parts 220), and outputs unsuitable condition information (part name, lot number, etc.) that identifies a part in which an unsuitable condition is detected and the lot of the part. The display 62 is an exemplary lot information input accepting section and an exemplary outputting section.

Figure 11:
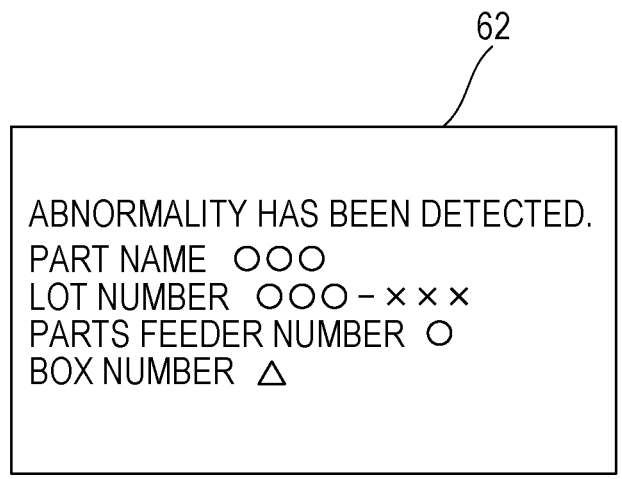
FIG. 11 shows a state in which the display of the assembling device according to the embodiment of the present disclosure displays unsuitable condition information.

In the embodiment, the display 62 is formed so as to be controlled by the controller 61 so that the display 62 displays unsuitable condition information with the lot information of a part in which an unsuitable condition is detected allowing identification of a part that is accommodated in the feeder among the parts feeders 4a to 4h and linearly moving feeders 5a and 5b and that is of a lot that is the same as that of the part in which an unsuitable condition is detected, for discarding the part. More specifically, as shown in FIG. 11, when an unsuitable condition in a part (such as a part 217) is detected, the display 62 displays, for example, the part name (the part 217), the lot number, and the number that identifies the parts feeder in which the part is accommodated or the number that identifies the linearly moving feeder in which the part is accommodated. Further, the display 62 is formed so as to display the number that identifies the box 8 accommodating the piping component 200 using the part of a lot number that is the same as that of the part in which an unsuitable condition is detected. The remaining parts that are accommodated in the parts feeders and that are not detected as being unsuitable among the plurality of types of parts are used in producing the piping component 200. For example, if an unsuitable condition is detected in the part 217, the parts other than the part 217 (that is, the cover 211, the part 212, the packing 213, the part 214, the packing 216, and the part 220) are used in producing the piping component 200.

In the embodiment, the plurality of types of parts include at least two types of parts that differ in number included in one lot (for example, 500 parts 217 per lot, and 1000 parts 220 per lot). The display 62 is formed so that, for each of the plurality of types of parts, the display 62 is capable of accepting, as inputs of lot information, inputs of the number of parts included in a lot that is input, information allowing the lot to be identified (such as the lot number) that is input, and information allowing the part to be identified (such as the part name) that is input.

As shown in FIG. 10, the operating panel 6 is connected to the robots 3a, 3b, and 3c through the robot controllers (not shown). The operating panel 6 is also connected to the parts feeders 4a to 4h and the linearly moving feeders 5a and 5b. The operating panel 6 is further connected to the conveyor 7.

Figure 12:
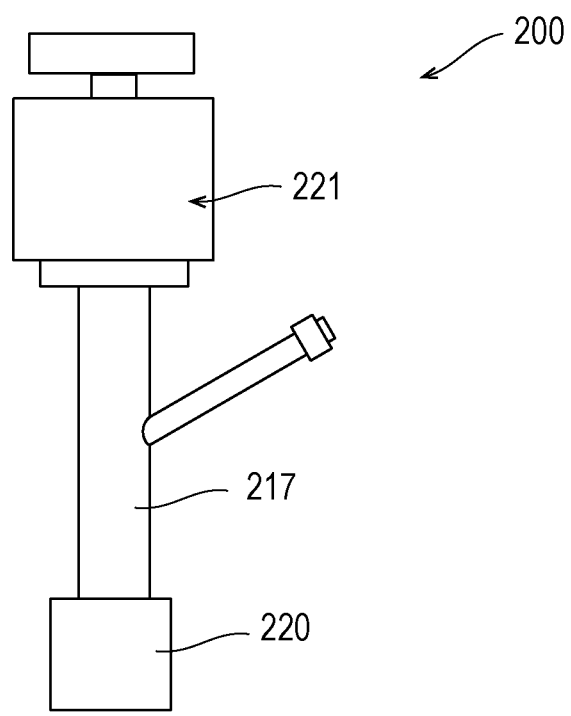
FIG. 12 is a front view of a piping component that is assembled by the assembling device according to the embodiment of the present disclosure.
Figure 13:
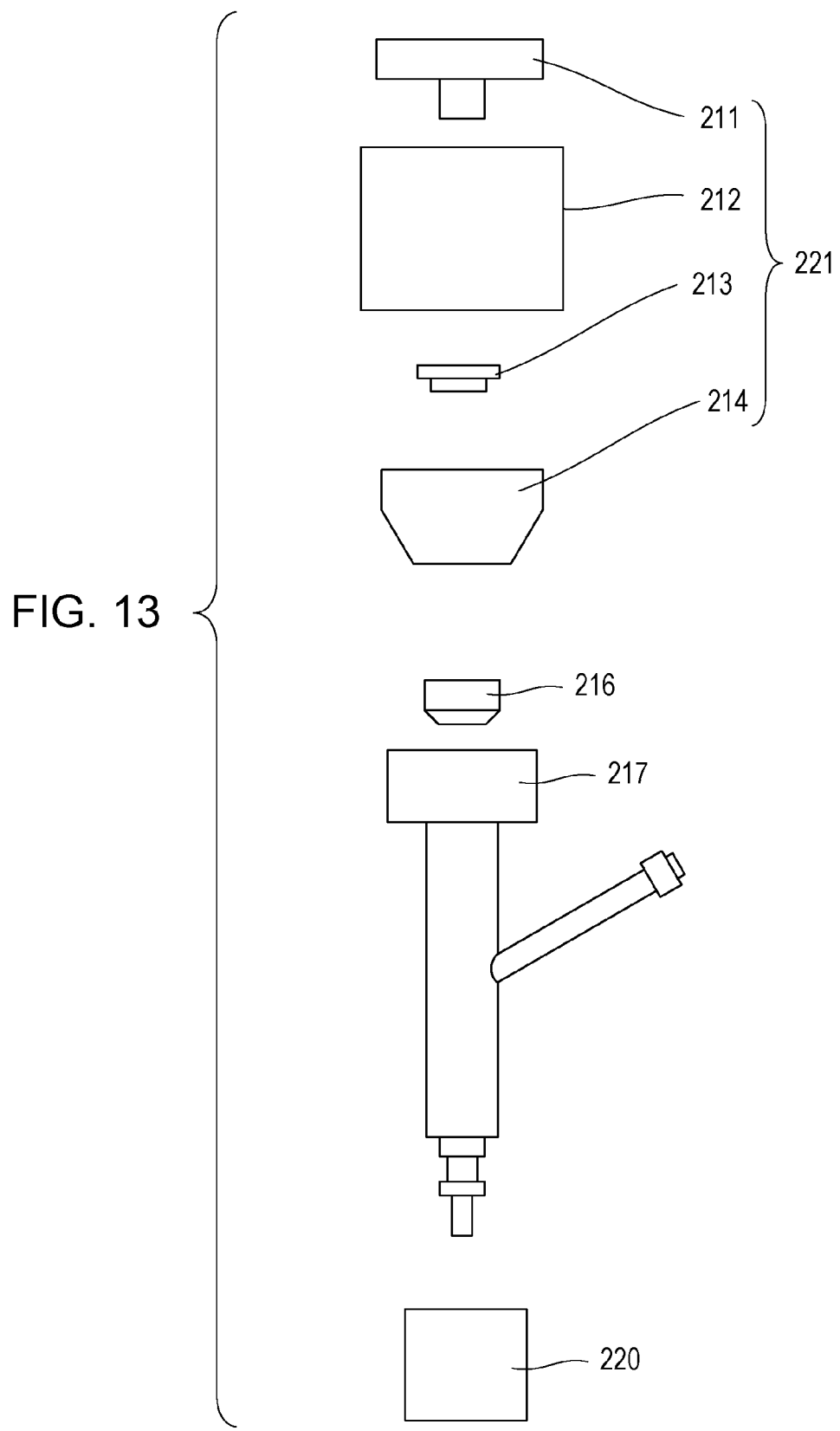
FIG. 13 is an exploded view of the piping component that is assembled by the assembling device according to the embodiment of the present disclosure.

As shown in FIGS. 12 and 13, the piping component 200 includes the cover 211, the part 212, the packing 213, the part 214, the packing 216, the part 217, and the part 220. The part 221 is formed by the cover 211, the part 212, the packing 213, and the part 214.

The top portion of the part 212 is formed so that the cover 211 is press-fitted thereto. The part 212 is formed so that the part 214 is inserted into the part 212. The top portion of the part 217 is formed so that the packing 216 is inserted into the part 217.

The cover 211 and the part 212 of the part 221 are formed so as to be supplied from the parts feeder 4a and the parts feeder 4b, respectively. The packing of 213 and the packing 214 of the part 221 are formed so as to be supplied from the parts feeder 4c and the parts feeder 4d, respectively. The packing 216 is formed so as to be supplied from the parts feeder 4f. The part 217 is formed so as to be supplied from the parts feeder 4e. The part 220 is formed so as to be supplied from the parts feeder 4h. The cover 211, the part 212, the packing 213, the part 214, the packing 216, the part 217, and the part 220 may be formed so as to be supplied from the linearly moving feeders 5a and 5b.

Next, the operation of the controller 61 when supplying the parts will be described with reference to FIG. 14.

Figure 14:
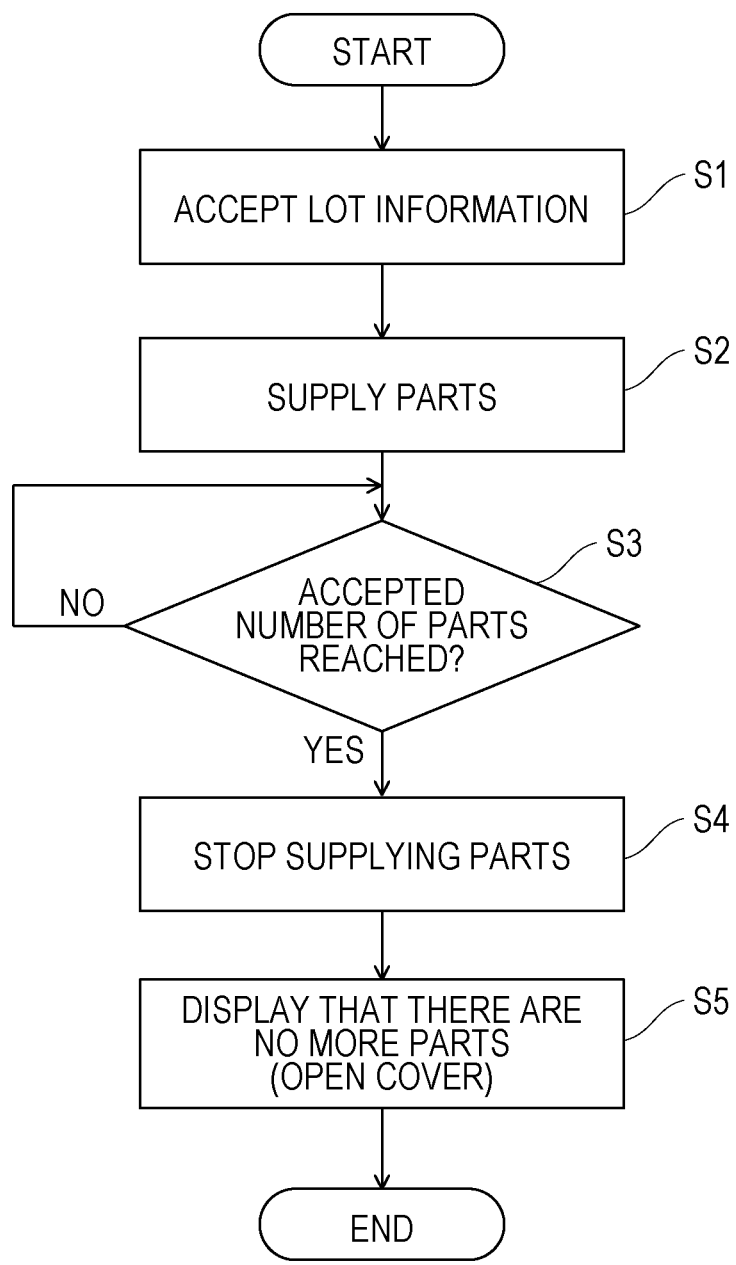
FIG. 14 is a flowchart illustrating a parts supply process of the assembling device according to the embodiment of the present disclosure.

As shown in the flowchart of FIG. 14, in Step S1, the controller 61 accepts through the touch-panel display 62 input of lot information (part name, lot number, number of parts (such as 500 parts 217)) of a plurality of types of parts (that is, a cover 211, a part 212, a packing 213, a part 214, a packing 216, a part 217, and a part 220). That is, the lot information is input when a user 300 performs an input operation at the touch-panel display 62 of the operating panel 6. The user 300 replenishes the parts feeders 4a to 4h with parts (for example, the parts feeders 4e with parts 217) and the linearly moving feeders 5a and 5b with parts. The parts prior to replenishing the parts feeders 4a to 4h (the linearly moving feeders 5a and 5b) with parts are accommodated in, for example, bags according to lot. The parts feeders 4a to 4h (linearly moving feeders 5a and 5b) may not be replenished with all of the parts in the bags, such as when some of the parts in the bag are taken out by the user 300. In this case, the number of parts that are actually used for the replenishment is input by the user 300.

Next, in Step S2, parts are supplied to the vicinity of the robots 3a and 3b by the parts feeders 4a to 4h (linearly moving feeders 5a and 5b). When the parts are being supplied by the parts feeders 4a to 4h (linearly moving feeders 5a and 5b), the numbers of parts that are supplied by the respective parts feeders 4a to 4h (linearly moving feeders 5a and 5b) are counted. Then, in Step S3, it is determined whether or not any one of the numbers of supplied parts has reached the number of parts accepted by the display 62 of the operating panel 6. If, in Step S3, it is determined that any one of the numbers of supplied parts has not reached the number of parts accepted by the display 62, this operation is repeated.

If, in Step S3, it is determined that any one of the numbers of supplied parts has reached the number of parts accepted by the display 62 of the operating panel 6, the supply of parts by the parts feeder among the parts feeders 4a to 4h (linearly moving feeders 5a and 5b) that has accommodated parts whose number is determined as having reached the accepted number of parts is stopped in Step S4. Then, in Step S5, the display 62 displays that the number of supplied parts has reached the number of parts accepted by the display 62 (that there are no more parts) (see FIG. 6). When there are no more parts in the parts feeder among the parts feeders 4a to 4h, the controller 61 controls driving so that the cover 44 of the parts feeder among the parts feeders 4a to 4h that has accommodated the parts whose number is determined as having reached the accepted number of parts is set so as to be in an open state (see FIG. 5), so that parts of a next lot can be supplied. For example, after the parts feeder 4e that supplies the parts 217 has supplied 500 parts 217, the supply of the parts 217 by the parts feeder 4e is stopped, so that the cover 44 of the parts feeder 4e is set in an open state. The covers 44 of the parts feeders other than that of the parts feeder 4e is maintained in a closed state. Then, the user 300 replenishes the parts feeder 4e whose cover 44 is in an open state with parts 217 of a next lot.

Next, the operation of the controller 61 when an unsuitable condition in a part is detected by the robots 3a and 3b will be described with reference to FIGS. 15 and 16.

Figure 15:
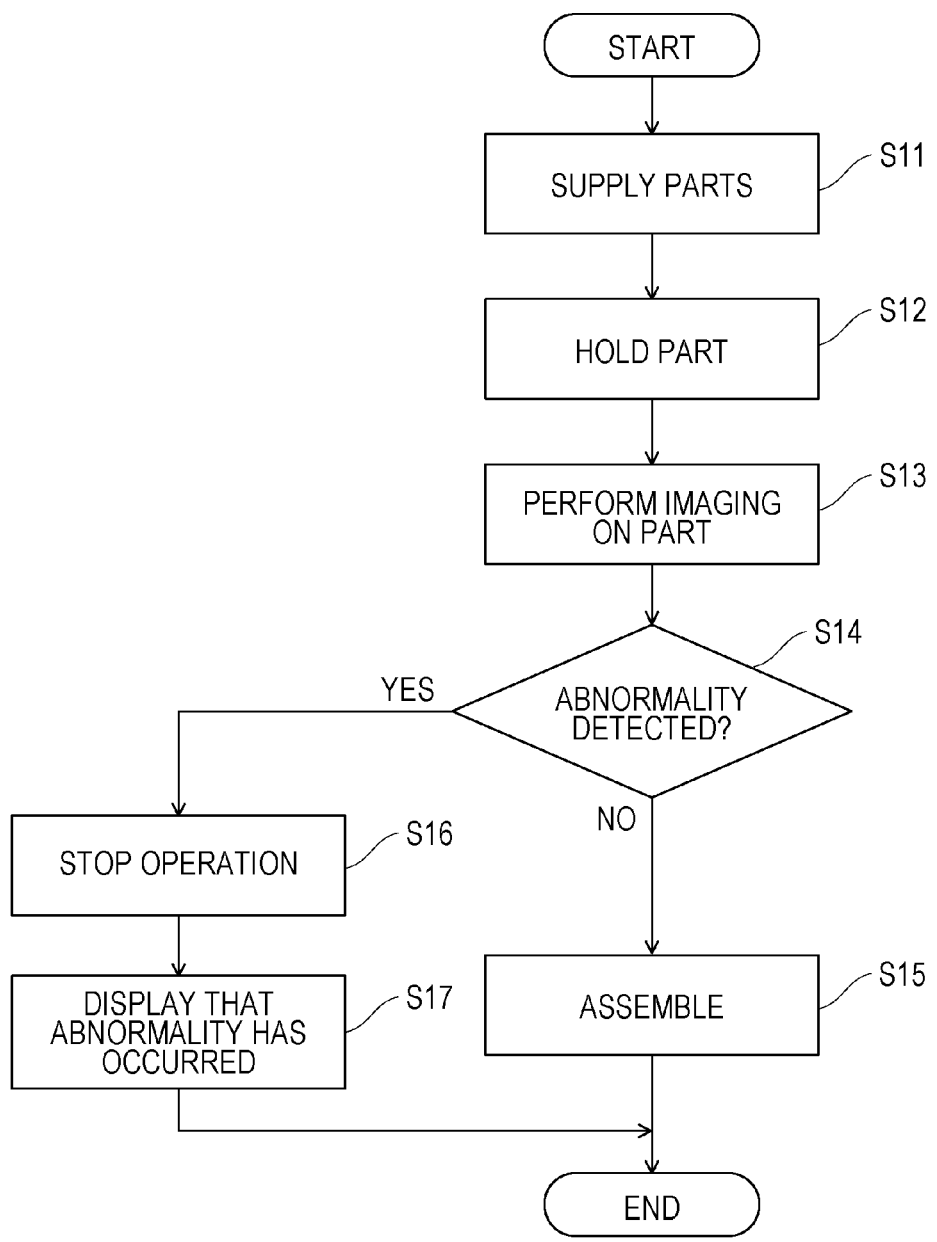
FIG. 15 is a flowchart illustrating an unsuitable condition detecting process of the assembling device according to the embodiment of the present disclosure.

As shown in the flowchart in FIG. 15, in Step S11, the controller 61 performs control so that parts (covers 211, parts 212, packings 213, parts 214, packings 216, parts 217, and parts 220) are supplied from the parts feeders 4a to 4h and the linearly moving feeders 5a and 5b. Next, in Step S12, the part (such as the part 217) is held by the chuck 33a (chuck 33b) of the robot 3a (robot 3b).

Figure 16:
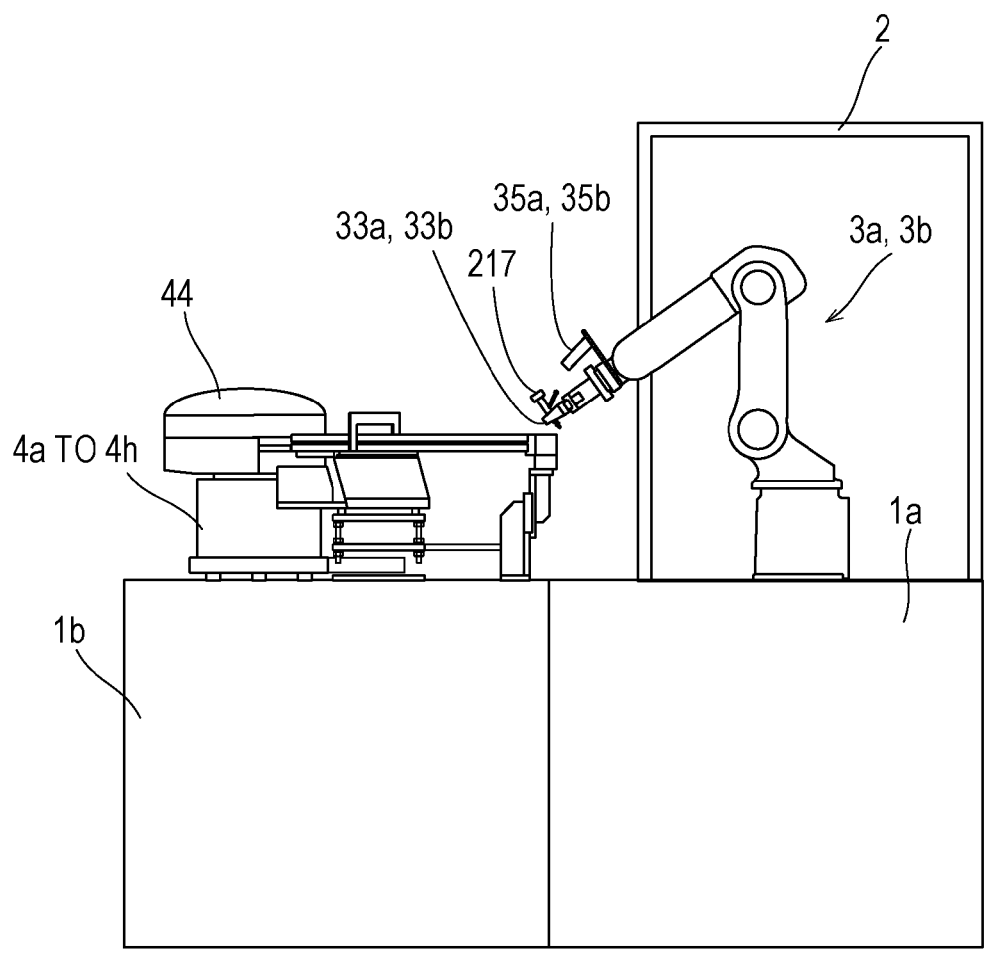
FIG. 16 illustrates an operation in which each robot of the assembling device according to the embodiment of the present disclosure is detecting an unsuitable condition.

Next, in Step S13, as shown in FIG. 16, the image pickup camera 35a (35b) of the robot 3a (3b) performs imaging on the part. Then, in Step S14, on the basis of the part subjected to imaging, detection is performed for detecting any unsuitable condition (such as scratches, air bubbles in the part) of the part. If, in Step S14, an unsuitable condition is not detected in the part, the assembly of the part is performed by the robot 3a (robot 3b) in Step S15.

If, in Step S14, an unsuitable condition is detected in the part, the operation of the assembling device 100 (the robots 3a, 3b, and 3c, the parts feeders 4a to 4h, the linearly moving feeders 5a and 5b, and the conveyor 7) is stopped. Then, in Step S17, as shown in FIG. 11, the display 62 of the operating panel 6 displays the part name, the lot number, the number that identifies the parts feeder or the linearly moving feeder in which the part is accommodated, and the number that identifies the box 8 accommodating the piping component 200 using the part of a lot number that is the same as that of the part in which an unsuitable condition is detected. Then, the user 300 visually determines whether or not an unsuitable condition has occurred in the part. If the user 300 determines that an unsuitable condition has occurred in the part, the user 300 discards the part in the parts feeder determined as being unsuitable, on the basis of the number, displayed on the display 62, that identifies the parts feeder accommodating the part. In addition, the user 300 discards the piping component 200 in the box 8 on the basis of the number, displayed on the display 62, that identifies the box 8 that accommodates the piping component 200 using the part of a lot number that is the same as that of the part in which an unsuitable condition is detected. If the user 300 does not determine that an unsuitable condition has occurred in the part, the user 300 operates the operating panel 6 to continue the assembly in Step S15.

Next, the assembly of the piping component 200 will be described with reference to FIG. 13.

First, the robot 3a holds the part 214. Then, the robot 3c applies grease to an inner portion of the part 214, and applies an adhesive to an outer portion of the part 214. Next, the robot 3a secures the part 214 to the part assembly jig 10 (see FIG. 1), after which the robot 3a inserts the packing 213 into the part 214. The robot 3c further applies grease to an inner peripheral portion of the packing 213.

Next, after the part 212 is held by the robot 3a, the part 212 is secured to the spindle motor 11 (see FIG. 1). The part 212 that is secured to the spindle motor 11 is screwed into the part 214 by the spindle motor 11. Then, after the cover 211 is held by the robot 3a, the cover 211 is secured to the press-fitting device 12 (see FIG. 1). Then, the cover 211 secured to the press-fitting device 12 is press-fitted to the part 212. This causes the part 221 to be completed. Then, the robot 3b holds the part 221, and the part 221 is secured to the spindle motor 11.

After the part 217 is held by the robot 3b, the part 217 is secured to the parts assembly jig 9 (see FIG. 1). The robot 3c applies grease to an outer portion of the part 217. Thereafter, the robot 3b holds the packing 216, and inserts the packing 216 into the part 217.

Next, the robot 3b holds the part 217, and screws the part 221 secured to the spindle motor 11 into the part 217. Lastly, the part 217 to which the part 221 is mounted is press-fitted to the part 220, so that the piping component 200 is completed.

In the embodiment, as described above, there is provided the display 62 that outputs unsuitable condition information identifying the lot of a part in which an unsuitable condition is detected when an unsuitable condition is detected in the part (the cover 211, the part 212, the packing 213, the part 214, the packing 216, the part 217, or the part 220). This makes it possible to easily identify a part included in a lot that is the same as that of the part in which an unsuitable condition is detected, on the basis of the unsuitable condition information output by the display 62. Therefore, it is possible to suppress the use of a part included in a lot that is the same as that of the part in which an unsuitable condition is detected in the assembly. Even if the part included in the lot that is the same as that of the part in which an unsuitable condition is detected is used in assembling the piping component, when the lot of the part in which an unsuitable condition is detected is identified, it is possible to identify the piping component 200 including the part included in the lot that is the same as that of the part in which an unsuitable condition is detected. This makes it possible to, for example, discard the piping component 200 including the part included in the lot that is the same as that of the part in which an unsuitable condition is detected.

In the embodiment, as described above, the plurality of parts feeders 4a to 4h (linearly moving feeders 5a and 5b) for supplying a plurality of types of parts according to lot are provided, and the display 62 displays unsuitable condition information with the lot information of a part in which an unsuitable condition is detected allowing identification of a part that is accommodated in the feeder among the parts feeders 4a to 4h (the linearly moving feeders 5a and 5b) and that is of a lot that is the same as that of the part in which an unsuitable condition is detected. By this, on the basis of the unsuitable condition information that is output by the display 62, it is possible to easily discard the part accommodated in the parts feeder among the parts feeders 4a to 4h (linearly moving feeders 5a and 5b) included in the lot that is the same as that of the part in which an unsuitable condition is detected.

In the embodiment, as described above, the remaining parts that are accommodated in the parts feeders among the parts feeders 4a to 4h (linearly moving feeders 5a and 5b) and that are not detected as being unsuitable among the plurality of types of parts are used in assembling the piping component 200. Therefore, unlike the case in which even remaining parts that are accommodated in the parts feeders among the parts feeders 4a to 4h (linearly moving feeders 5a and 5b) and that are not detected as being unsuitable are discarded, it is possible to suppress wasteful use of parts.

In the embodiment, as described above, the plurality of types of parts include at least two types of parts that differ in number included in one lot. The display 62 is formed so that, for each of the plurality of types of parts, the display 62 is capable of accepting, as inputs of lot information, inputs of the number of parts included in a lot that is input, information allowing the lot to be identified that is input, and information allowing the part to be identified that is input. This makes it possible to manage lot information according to each of the plurality of types of parts that differ in number included in one lot. Therefore, it is possible to perform, with each part type, control regarding whether or not there are no longer parts accommodated in the parts feeders 4a to 4h (linearly moving feeders 5a and 5b), and to perform, with each part type, control regarding parts to be discarded.

In the embodiment, as described above, the robot 3a and the robot 3b are formed so as to detect any unsuitable condition occurring in a part. This makes it possible to detect any unsuitable condition occurring in a part from a plurality of angles of view by moving (rotating) the chuck 33a of the robot 3a and the chuck 33b of the robot 3b. Therefore, it is possible to increase the precision with which an unsuitable condition is detected.

In the embodiment, as described above, the robots 3a, 3b, and 3c are controlled so that, when an unsuitable condition is detected in a part, the robots 3a, 3b, and 3c stop the assembly of the plurality of types of parts and do not perform the assembly using a part of the lot information that is the same as that of the part in which an unsuitable condition is detected. This stops the assembly of parts when an unsuitable condition in a part is detected. Therefore, it is possible to easily suppress the use of a part in which an unsuitable condition is detected in assembling the piping component 200.

In the embodiment, as described above, the image pickup camera 35a (35b) is provided on the robot 3a (3b). Any unsuitable condition occurring in a part can be detected by performing imaging on the part by the image pickup camera 35a (35b) of the robot 3a (3b) prior to assembling the plurality of types of parts by the robot 3a (3b). Therefore, unlike the case in which an unsuitable condition in a part is detected after the assembly, since assembly using an unsuitable part is not performed, it is possible to omit futile operations of the assembling device 100 accordingly.

In the embodiment, as described above, a piping component 200 formed after assembling a plurality of types of parts is accommodated in a box 8 where part lot information is identifiable. Therefore, when an unsuitable condition in a part is detected, it is possible to, on the basis of the part lot information, discard piping components 200 including parts in which an unsuitable condition is detected according to each box 8. Consequently, it is possible to make the discarding of the piping components 200 less troublesome.

In the embodiment, as described above, when the number of parts supplied by any one of the parts feeders 4a to 4h (linearly moving feeders 5a and 5b) has reached the number of parts accepted by the display 62, it is indicated that the number of supplied parts has reached the accepted number of parts. This allows the user 300 to easily know that there are no more parts accommodated in the parts feeder among the parts feeders 4a to 4h (linearly moving feeders 5a and 5b).

In the embodiment, as described above, the parts feeders 4a to 4h are provided with the covers 44. In addition, when the number of parts supplied by any one of the parts feeders 4a to 4h has reached the number of parts accepted by the display 62, the cover 44 of the parts feeder among the parts feeders 4a to 4h opens, so that parts of a next lot can be supplied. Therefore, the accidental supply of parts by the user 300 to the remaining parts feeders in which parts remain among the parts feeders 4a to 4h is easily suppressed.

In the embodiment, as described above, the display 62 is a touch-panel display 62 that is capable of accepting inputs of lot information and that is capable of outputting unsuitable condition information. Therefore, unlike the case in which the acceptance of the inputs of lot information and the output of unsuitable condition information are performed by different devices, the acceptance of the inputs of lot information and the output of unsuitable condition information can be performed by a simple structure.

The embodiment disclosed this time is an exemplification on all points, and is not to be construed as being limitative. The scope of the present disclosure is indicated by the scope of the claims instead of the description of the above-described embodiment, and includes all modifications within the meaning and scope of equivalents to the scope of the claims.

For example, although, in the embodiment, the exemplary case in which the present disclosure is applied to an assembling device that assembles a piping component is described, the present disclosure is not limited thereto. For example, the present disclosure may be applied to an assembling device that assembles a finished product other than piping components, or to a processing device other than an assembling device.

Although, in the embodiment, the exemplary case in which the present disclosure is applied to an assembling device that assembles a piping component is described, the present disclosure is not limited thereto. For example, the present disclosure may be applied to a medical component, such as an intravenous drip injection component, other than a piping component, or to an assembling device that assembles an electronic component of, for example, an automobile or a household electric appliance.

Although, in the embodiment, the exemplary case in which robots are used as producing devices according to the present disclosure is described, the present disclosure is not limited thereto. In the present disclosure, producing devices other than robots may be used.

Although, in the embodiment, the exemplary case in which image pickup cameras are provided at arm portions of respective robots is described, the present disclosure is not limited thereto. For example, it is possible to dispose an image pickup camera so as to be adjacent to a robot, and move a part held by the chuck of the robot to the vicinity of the image pickup camera in order to perform imaging on the part.

Although, in the embodiment, the exemplary case in which an unsuitable condition in a part is detected by performing imaging on the part using image pickup cameras provided at the respective arm portions of robots is described, the present disclosure is not limited thereto. For example, it is possible to detect an unsuitable condition in a part by detecting application of an unsuitable torque on a servo motor of a robot when the robot assembles the part. In this case, the shape of the part may be distorted. Alternatively, it is possible for a user to visually detect an unsuitable condition in the part.

Although, in the embodiment, the exemplary case in which assembled piping components are accommodated in boxes is described, the present disclosure is not limited thereto. For example, the assembled piping components may be directly placed on a conveyor.

Although, in the embodiment, the exemplary case in which labels, on which lot information of parts (lot number of each part) are indicated, are attached to side surfaces of boxes is described, the present disclosure is not limited thereto. For example, bar codes including lot information of parts may be attached to the boxes, or IC tags including lot information may be provided on the parts.

Although, in the embodiment, the exemplary case in which a user discards a piping component using a part of a lot that is the same as the lot of a part in which an unsuitable condition is detected is described, the present disclosure is not limited thereto. For example, a piping component using a part of a lot that is the same as that of a part in which an unsuitable condition is detected may be automatically discarded on the basis of unsuitable condition information.

Although, in the embodiment, the exemplary case in which, when the number of parts supplied by a parts feeder has reached the number of parts accepted at the display, the cover of the parts feeder opens to indicate that the number of parts supplied by the parts feeder has reached the number of parts accepted at the display, is described, the present disclosure is not limited thereto. For example, when the number of parts supplied by a parts feeder has reached the number of parts accepted at the display, this may be indicated by turning on an alarm or a warning light. Alternatively, this may be indicated when the number of parts supplied by a parts feeder has reached a previously set number of parts before reaching the number of parts accepted at the display.

Although, in the embodiment, the exemplary case in which the display accepts inputs of lot information and outputs (displays) unsuitable condition information is described, the present disclosure is not limited thereto. For example, the acceptance of the inputs of lot information and the output (display) of unsuitable condition information may be performed by different devices.

Although, in the embodiment, the exemplary case in which inputs of lot information are accepted when a user operates a touch-panel display is described, the present disclosure is not limited thereto. For example, the lot information of parts may be accepted by reading bar codes or IC tags that include lot information and that are provided on bags accommodating parts according to lot. In this case, the display may not be a touch-panel display.

Although, in the embodiment, the exemplary case in which a piping component (finished product) assembled from a plurality of types of parts is described, the present disclosure is not limited thereto. For example, the finished component may be assembled from the same type of parts.

It should be understood by those skilled in the art that various modifications, combinations, sub-combinations and alterations may occur depending on design requirements and other factors insofar as they are within the scope of the appended claims or the equivalents thereof.

What is claimed is:

1. A production system comprising:
   a producing device that produces a predetermined finished product from the same type or a plurality of types of parts;
   a plurality of parts suppliers that supply the same type or the plurality of types of parts, each of the parts suppliers operable to transport the same type or the plurality of types of parts to a robot;
   a lot information input accepting section that accepts an input of lot information of at least one part of the same type or the plurality of types of parts used in producing the finished product by the producing device; and
   an outputting section that outputs unsuitable condition information when an unsuitable condition in any of the parts is detected, the unsuitable condition information identifying a lot of the any of the parts in which the unsuitable condition is detected,
   wherein, when the unsuitable condition is detected, the unsuitable condition information also identifies a parts supplier among the plurality of parts suppliers which accommodated the part in which the unsuitable condition was detected and operation of the plurality of parts suppliers is stopped.

2. The production system according to claim 1, wherein the outputting section outputs the unsuitable condition information, with lot information of the any of the parts in which the unsuitable condition is detected allowing identification of a part that is accommodated in the parts supplier and that is of a lot that is the same as that of the any of the parts in which the unsuitable condition is detected.

3. The production system according to claim 2, wherein a remaining part or remaining parts that are accommodated in the parts supplier or parts suppliers and that are not detected as being unsuitable among the same type or the plurality of types of parts are used to produce the finished product.

4. The production system according to claim 1, wherein the plurality of types of parts include at least two types of parts that differ in number included in one lot, and
   wherein the lot information input accepting section is formed so that, for each of the same type or the plurality of types of parts, the lot information input accepting section is capable of accepting, as lot information, the number of parts included in a lot that is input, information allowing the lot to be identified that is input, and information allowing the part to be identified that is input.

5. The production system according to claim 1, wherein the finished product after being assembled from the same type or the plurality of types of parts is accommodated in a box where lot information of the parts is identifiable.

6. The production system according to claim 1,
   wherein the lot information accepted by the lot information input accepting section includes the number of parts according to the same type of parts or the plurality of types of the parts included in a lot that is input, and
   wherein, when the number of parts supplied by any of the parts suppliers has reached the number of parts accepted by the lot information input accepting section, it is indicated that the number of supplied parts has reached the number of parts accepted by the lot information input accepting section.

7. The production system according to claim 6, wherein each parts supplier includes a cover, and wherein, when the number of parts supplied by the any of the parts suppliers has reached the number of parts accepted by the lot information input accepting section, the cover of the any of the parts suppliers opens, so that a part of a next lot is in a suppliable state.

8. The production system according to claim 1,
   further comprising a touch-panel display including the lot information input accepting section and the outputting section.

9. The production system according to claim 1, wherein the finished product is a medical component.

10. The production system according to claim 1, further comprising a display,
    wherein the display displays the unsuitable condition information identifying the parts supplier among the plurality of parts suppliers which accommodated the part in which the unsuitable condition was detected.

11. An article producing method comprising:
accepting at a lot information input accepting section lot information of at least one part of the same type or a plurality of types of parts used in a producing operation by a producing device that produces a predetermined finished product from the same type or the plurality of types of parts;
supplying the same type or the plurality of types of parts by transporting the same type or the plurality of types of parts by a plurality of parts suppliers to a robot; and
outputting unsuitable condition information at an outputting section when an unsuitable condition in any of the parts is detected, the unsuitable condition information identifying a lot of the any of the parts in which the unsuitable condition is detected,
wherein, when the unsuitable condition is detected, the unsuitable condition information also identifies a parts supplier among the plurality of parts suppliers which accommodated the part in which the unsuitable condition was detected and the operation of the plurality of parts suppliers is stopped.

12. The article producing method according to claim 11, further comprising:
displaying, on a display, the unsuitable condition information identifying the parts supplier among the plurality of parts suppliers which accommodated the part in which the unsuitable condition was detected.

* * * * *